3,097,931
METHODS OF JOINING GRAPHITIC SURFACES
Hugh Wilson Davidson, Pinner, and John Walter Ryde, Northwood, England, assignors to The General Electric Company Limited, London, England
No Drawing. Filed Oct. 28, 1957, Ser. No. 692,538
Claims priority, application Great Britain Oct. 29, 1956
4 Claims. (Cl. 29—195)

This invention relates to a method of joining graphitic surfaces.

According to the present invention, in a method of joining graphitic surfaces, the surfaces are coated with nickel by heating the surfaces and subjecting them to an atmosphere of or containing nickel carbonyl, the nickel coated surfaces being subsequently bonded together.

The surfaces are preferably heated to a temperature within the range 200° C.–500° C. when subjected to the said atmosphere, which may comprise a suspension of nickel carbonyl vapour in hydrogen. The bonding of the nickel coated surfaces may be effected by simultaneously urging the surfaces together under pressure and heating them to a temperature sufficient to cause the nickel on the surfaces to unite, or alternatively it may be effected by placing a washer of bonding material between the surfaces under pressure and heating the whole to a temperature sufficient to cause the surfaces and the washer to unite. Bonding materials for this purpose will be suited to the circumstances in which the joined graphitic surfaces are to be used; for nuclear reactor applications, zirconium or nickel itself may be used. The heating of the surfaces during bonding is preferably effected by induction, for example by eddy-current heating.

The invention also includes a method of joining a graphitic surface to a metallic surface, wherein the graphitic surface is coated with nickel by heating the surface and subjecting it to an atmosphere of or containing nickel carbonyl, the nickel coated surface being subsequently bonded to the said metallic surface.

In carrying the invention into effect, according to one example, two graphite specimens whose end surfaces are to be joined are placed towards the axis of a cylindrical vessel with their end faces exposed to the atmosphere within the vessel. The coil of eddy-current heating equipment is placed around the vessel and close to it, so that the graphite specimens may be heated to a temperature within the range 200° C.–500° C. with minimum increase in temperature of the walls of the vessel. The vessel is arranged to be supplied with an atmosphere comprising a suspension of nickel carbonyl vapour in hydrogen, and for this purpose the hydrogen is passed, at a pressure a little above atmospheric, through liquid nickel carbonyl which has recently been purified by vacuum distillation. A part of the suspension thus formed is bled off and passes through a flowmeter and a chamber containing glass beads upon which the nickel is arranged to be deposited under known conditions, so that the concentration of nickel carbonyl in the suspension may be estimated. The remainder of the nickel carbonyl is arranged to flow into the vessel containing the graphite specimens, which have previously been heated to a temperature of approximately 400° C. The vessel is provided with a glass window so that the radiation from the graphite specimens may be taken to a total radiation pyrometer and the temperature of the specimens estimated; an exit from the vessel is also provided for excess nickel carbonyl, which is dissociated in a further chamber containing glass beads.

When it is judged that a sufficient coating of nickel has been formed upon the exposed surface of the graphite specimens, this part of the process is discontinued and the specimens are removed. They are then bonded together by placing the coated surfaces together under pressure, arranging a further eddy-current heating coil around the surfaces and raising them to a temperature of the order of 1300° C., when the nickel deposit is observed to melt and flow so as to unite the butting surfaces of the graphite specimens.

The invention may be applied to the joining together in line of graphite tubes for use in nuclear reactors, the butting end surfaces of two adjacent tubes being suitably coated with nickel and the butting ends bonded together in the way described in the example. Alternatively, a nickel or zirconium washer may be placed between the surfaces under pressure during bonding. It is desirable in such applications to limit the amount of nickel used, because nickel has a greater capture cross-section for neutrons than carbon and it will depend upon the design of the reactor whether or not a certain quantity of nickel is tolerable. For this reason, it may be preferable to use a washer of a material such as zirconium between the end surfaces of the graphite tubes.

The invention may also be applied to the attaching of graphite end caps to graphite cans or casings for the fuel elements of nuclear reactors, such fuel elements being of, say, uranium or uranium carbide. Such a can or casing may consist of a hollow cylindrical graphite portion together with graphite end caps, and these end caps may be attached to the cylindrical portion by the method of joining in accordance with the present invention. The can or casing may be of graphite made in accordance with the specification of co-pending U.S. patent application Serial No. 676,435, filed August 5, 1957, by Hugh Wilson Davidson, for Processes for the Production of Graphite, and assigned to the assignee of the instant application, said co-pending application having been abandoned and the subject matter thereof being contained in a continuation-in-part co-pending application Serial No. 853,479, filed November 17, 1959, by Hugh Wilson Davidson, for Production of Carbon, and also assigned to the same assignee, an essential feature of such graphite being the use of cellulose in the production thereof.

One advantage of the method of joining graphitic surfaces in accordance with the invention is that there is no increase in the gas content of the graphite material so joined. Other methods relying on pitch or resins which diffuse into the parts to be bonded and key the parts together upon baking, produce a high residual gas content in the parts.

We claim:

1. A method of joining graphitic surfaces, said method comprising, exposing said surfaces to an atmosphere in which nickel carbonyl is suspended, heating said surfaces to cause decomposition of said nickel carbonyl to take place at the surfaces and to coat said surfaces with a thin layer of nickel, urging said surfaces toward each other, and while so urging said surfaces toward each other heating the surfaces to a temperature sufficient to cause the nickel coating to melt and flow so as to unite the butting graphitic surfaces.

2. A composite graphitic body whose component parts are united by the method set forth in claim 1.

3. A method of joining a graphitic surface to a surface of a metal selected from the class consisting of nickel and zirconium, said method comprising, exposing said graphitic surface to an atmosphere in which nickel carbonyl is suspended, heating said surface to cause decomposition of said nickel carbonyl to take place at the surface and to coat said surface with a thin layer of nickel, bringing said coated surface into contact with said metallic surface, urging said surfaces toward each other, and while urging said surfaces toward each other heating them to at least a temperature sufficient to cause the nickel coating to melt and flow so as to unite the butting graphitic surface and metallic surface.

4. A composite graphitic metallic body whose graphitic and metallic parts are united by the method as set forth in claim 3.

References Cited in the file of this patent
UNITED STATES PATENTS

| | | | |
|---|---|---|---|
| 656,652 | Markey | Aug. 28, | 1900 |
| 1,246,909 | Goldschmidt et al. | Nov. 20, | 1917 |
| 1,312,262 | King | Aug. 5, | 1919 |
| 2,130,879 | Dobke | Sept. 20, | 1938 |
| 2,333,622 | McNab | Nov. 2, | 1943 |
| 2,671,746 | Brew | Mar. 9, | 1954 |
| 2,739,375 | Coxe | Mar. 27, | 1956 |
| 2,754,238 | Arenberg | July 10, | 1956 |
| 2,760,261 | Pawlyk et al. | Aug. 28, | 1956 |
| 2,785,082 | Clough et al. | Mar. 12, | 1957 |
| 2,795,040 | Antel et al. | June 11, | 1957 |
| 2,798,843 | Slomin et al. | July 9, | 1957 |
| 2,857,663 | Beggs | Oct. 28, | 1958 |
| 2,859,512 | Dijksterhuis et al. | Nov. 11, | 1958 |
| 2,881,094 | Hoover | Apr. 7, | 1959 |